United States Patent [19]

Hansen et al.

[11] 4,229,338

[45] Oct. 21, 1980

[54] SUEDE-LOOK SHOE SOLES

[75] Inventors: David R. Hansen; Glenn R. Himes, both of Houston, Tex.

[73] Assignee: Shell Oil Company, Houston, Tex.

[21] Appl. No.: 38,037

[22] Filed: May 11, 1979

[51] Int. Cl.$^3$ ................................................ C08K 5/01
[52] U.S. Cl. .......................... 260/33.6 AQ; 36/32 R; 36/87; 260/33.6 PQ; 260/33.6 UA; 260/42.47
[58] Field of Search ............... 260/33.6 AQ, 33.6 PQ, 260/33.6 UA, 42.47; 36/87, 32 R

[56] References Cited

U.S. PATENT DOCUMENTS

| Re. 28,236 | 11/1974 | Hendricks et al. | 36/2.5 R |
|---|---|---|---|
| 2,071,250 | 2/1937 | Carothers | 260/106 |
| 2,071,253 | 2/1937 | Carothers | 260/112 |
| 2,130,523 | 9/1938 | Carothers | 260/124 |
| 2,130,948 | 9/1938 | Carothers | 18/54 |
| 3,594,452 | 7/1971 | De La Mare et al. | 260/880 |
| 3,595,942 | 7/1971 | Wald et al. | 260/880 |
| 4,126,600 | 11/1978 | Gergen et al. | 260/42.18 |
| 4,126,662 | 11/1978 | Middlebrook | 264/328 |
| 4,133,795 | 1/1979 | Hines | 260/33.6 AQ |
| 4,141,847 | 2/1979 | Kiovsky | 260/879 |
| 4,177,184 | 12/1979 | Condon | 260/32.6 A |

OTHER PUBLICATIONS

Kirk–Othmer, Encyclopedia of Chemical Technology, vol. 16, pp. 143–159 (1969), vol. 16, pp. 46 and 47 (1959).
Kirk–Othmer, Encylopedia of Chemical Technology, vol. 1, pp. 313 to 338 (1969).

*Primary Examiner*—Melvyn I. Marquis
*Attorney, Agent, or Firm*—Dean F. Vance

[57] ABSTRACT

A footwear composition having a simulated suede appearance is prepared by melt blending a monoalkenyl arene/diene block copolymer, oil, silica filler, styrene polymer, pigment and synthetic fiber at a temperature below the melting point of the fiber. The synthetic fiber is preferably selected from the group consisting of polyamide fibers, polyester fibers, acrylic fibers, and mixtures thereof.

8 Claims, No Drawings

SUEDE-LOOK SHOE SOLES

BACKGROUND OF THE INVENTION

The use of certain block copolymers and their compounds in a number of end-uses and especially in footwear, is rapidly expanding. For example, in the footwear industry, certain block copolymer compounds are being used in large volume in the manufacture of a wide variety of shoes including canvas shoes, sport shoes, and dress shoes. The block copolymers may be utilized for this purpose for soling, foxing, innersoles and the like. These compositions are disclosed in Hendricks et al, U.S. Pat. No. 28,236. In general, these shoe component compositions usually comprise a mixture of block copolymer, extending oil, polystyrene and possibly a filler. For the most part, these block copolymers have proved to be particularly advantageous in many respects, including flexibility, processability, lack of vulcanization requirement and wet slip. However, in certain respects, short-comings have been noted. In the past it has not been possible to obtain a shoe sole having a "smooth look" or "vulcanized rubber look" based on these block copolymers due mainly to the presence of weld lines and surface blemishes. In addition, the surface of the shoe sole was shiny—not a dull matte finish like vulcanized rubber. Conventional block copolymer compounds used in casual shoes circumvent these problems by having a rough "splayed" and textured surface caused by the water in the compound. This rough surface hides weld lines and surface blemishes. The conventional compounds with silica, however, are not satisfactory for the smooth look because the surface is too rough and because of "frosting" or whitening of the surface rubber. A new polymeric composition has been found for footwear applications that has a finish intermediate between the textured or crepe surface of prior art compounds and the surface of a vulcanized rubber shoe sole.

SUMMARY OF THE INVENTION

The present invention is a polymeric composition suitable for footwear applications comprising:
(a) 100 parts by weight of a block copolymer having at least two monoalkenyl arene polymer end blocks A and at least one elastomeric conjugated diene mid block B, each block A having an average molecular weight between about 5,000 and about 125,000 and each block B having an average molecular weight between about 15,000 and about 350,000, said blocks A comprising 8–65% by weight of the copolymer;
(b) about 5 to about 125 parts by weight of a styrene polymer;
(c) about 5 to 175 parts by weight of a hydrocarbon extending oil;
(d) about 5 to about 150 parts by weight of a finely divided silica filler;
(e) about 0.1 to about 10.0 parts by weight of a pigment; and
(f) about 5 to about 50 parts by weight of a synthetic fiber selected from the group consisting of polyamide fibers, polyester fibers, acrylic fibers, and mixtures thereof;
wherein the various components are melt blended at a temperature below the melting point of said synthetic fiber.

These footwear compositions appear to have a smooth matte finish at a distance of about three feet and have a "suede" appearance close up. The overall appearance is uniform and essentially free of weld lines. In addition, the other properties of the composition, such as flex crack resistance, hardness, abrasion resistance and adhesion, are good.

DETAILED DESCRIPTION OF THE INVENTION

The block copolymers employed in the present composition are thermoplastic elastomers and have at least two monoalkenyl arene polymer end blocks A and at least one elastomeric conjugated diene polymer mid block B. The number of blocks in the block copolymer is not of special importance and the macromolecular configuration may be linear, graft or radial (branched) depending upon the method by which the block copolymer is formed. Typical block copolymers of the most simple configuration would have the structure polystyrene-polyisoprene-polystyrene and polystyrene-polybutadiene-polystyrene. A typical radial polymer would comprise one in which the diene block has three or more branches, the tip of each branch being connected to a polystyrene block. See U.S. Pat. No. 3,594,452. Expressed another way, the invention also contemplates (but is not limited to) the use of configurations such as A—B+B—A)$_n$ where n varies from 1 to 5. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene.

The average molecular weights of each of the blocks may be varied as desired. The monoalkenyl arene polymer blocks preferably have average molecular weights between about 5,000 and about 125,000, more preferably between about 15,000 and about 100,000. The elastomeric conjugated diene polymer blocks preferably have average molecular weights between about 15,000 and about 350,000, more preferably between about 25,000 and about 150,000. The average molecular weights of the polystyrene end blocks are determined by gel permeation chromatography, whereas the polystyrene content of the polymer is measured by infrared spectroscopy of the finished block polymer. The weight percentage of the thermoplastic monoalkenyl arene blocks in the finished block polymer should be between about 8 and 65%, preferably between about 30% and about 50% by weight. The general type and preparation of these block copolymers are described in U.S. Ref. Pat. No. 28,236 and in many other U.S. and foreign patents. Mixtures of two or more different block copolymers are also contemplated.

The block copolymers useful in the compositions of this invention may also be hydrogenated either selectively, randomly or completely. Preferably, however, the block copolymers are not hydrogenated. Selected conditions may be employed, for example, to hydrogenate the elastomeric diene center block while not so modifying the monoalkenyl arene polymer blocks. Two examples of hydrogenated polymers are polyvinylcyclohexane-hydrogenated polyisoprene-polyvinylcyclohexane and polystyrene-hydrogenated polybutadiene-polystyrene. Preferably, blocks A are characterized in that no more than about 25% of the original aromatic double bonds are reduced by hydrogenation while blocks B are characterized by having at least 75% of the aliphatic double bonds reduced by hydrogenation. See generally U.S. Pat. No. 3,595,942.

The styrene polymer employed in the present formulations include both crystal grade polystyrene and high impact polystyrene. The term "high impact polystyrene" broadly comprises a major proportion of a styrene polymer, as herein defined, and as toughening agent an elastomeric polymer wherein the elastomeric polymer is present as discrete particles dispersed in a matrix of the styrene polymer. By "styrene polymer" or "crystal grade polystyrene" is meant any solid homopolymer or copolymer of styrene or a nuclear methyl substituted styrene having a softening point not less than 70° C. A preferred styrene polymer is polystyrene. Suitable copolymers can be obtained by copolymerizing styrene with other vinyl aromatic compounds such as ortho-, meta- or para-methyl styrene and 2,4-dichlorostyrene, or with comonomers which are not vinyl aromatic compounds such as acrylonitrile, methyl methacrylate, dimethyl itaconate and alpha-methyl styrene. Valuable compositions may also be derived from copolymers of ortho-, meta- or para-methyl styrene with copolymerizable monomers which are not vinyl aromatic compounds such as acrylonitrile, methyl methacrylate and dimethyl itaconate. In general, the comonomer is employed in a concentration of up to 40 percent by weight of the total monomers.

The amount of styrene polymer employed in the compositions of the present invention varies from about 5 to about 125 phr, preferably about 20 to about 90 phr. The term "phr" is well known, and means parts by weight per 100 parts by weight rubber (or block copolymer as in the present case).

The hydrocarbon rubber extending oils, usually referred to as paraffinic/naphthenic oils, are usually fractions of refined petroleum products having less than about 30% by weight of aromatics (by clay-gel analysis) and usually have viscosities between about 100 and 500 SSU at 100° F. Commercial extending oils include SHELLFLEX ® oils, No's. 310, 371 and 311 (which is a blend of 310 and 371). The amount of extending oil employed varies from about 5-175 phr, preferably from about 80-130 phr.

An essential feature of the present compositions lies in the use of silica powder rather than other fillers. The silica powder may be derived from a number of sources such as by precipitation, the burning of ortho silicic acid esters, (silica soot) hydrolysis of silicon tetrachloride, acidification of silicate solutions, or from grinding of minerals high in silica content. See generally the Kirk-Othmer Encyclopedia of Science and Technology, Volume 18, pages 61-72 (Interscience Publishers 1969). Preferably, the silica employed should be a hydrated silica. By "hydrated" is meant either silica powder bearing superficial amounts of free water physically absorbed on the surfaces, or bound water as a silicic acid. Mixtures of anhydrous and hydrated silicas may be used. The powder should have an average particle size no greater than 120 mµ and preferably between about 15 mµ and 50 mµ. The amount of silica filler employed varies from about 2 to about 150 phr, preferably about 5 to about 50 phr. The silica filler performs a very useful purpose by dissipating heat and reinforcing the compound. Without the silica filler the footwear compositions require longer cooling times and have low tear strength at higher temperatures.

The silica filler is essential in obtaining the suede appearance of the shoe soles molded from the present composition. The silica filler is very hygroscopic and adsorbs water readily. During the injection molding of shoe soles according to this invention, it appears that this water is released at elevated temperatures and that this released water, in conjunction with the fiber, provides the suede appearance on the surface of the sole. This suede appearance is in contrast to the crepe appearance of the soles produced according to U.S. Pat. No. 4,133,795, where a non-hygroscopic filler is employed.

The fibers employed in the present invention are selected from the group consisting of polyamide fibers, polyester fibers, acrylic fibers, and mixtures thereof. The preferred fibers are blends of polyester and acrylic fibers such as a blend of Orlon and Dacron fibers.

The polyamide fibers used herein are either fibers of nylon-6 or nylon-6,6. Their preparation is disclosed in numerous patents and articles including U.S. Pat. Nos. 2,071,250; 2,071,253; 2,130,523; 2,130,948 and in the Kirk-Othmer Encyclopedia of Chemical Technology, Volume 16, pages 46-47 (2nd ed. 1968).

The polyester fibers employed are defined by the Federal Trade Commission as "a manufactured fiber in which the fiber forming substance is any long chain synthetic polymer composed of at least 85% by weight of an ester of a dihydric alcohol and terephthalic acid (p-HOOCC$_6$H$_4$COOH)". The most common polyester in use is that derived from poly(ethylene terephthalate) (PET):

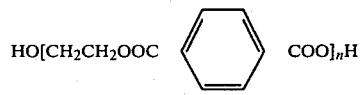

Commercial PET is available from DuPont under the tradename Dacron fiber. Another common polyester is poly(1,4-cyclohexylenedimethylene terephthalate), commercially available from Eastman Chemical under the tradename Kodel II:

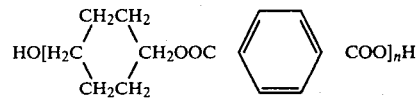

These polyester fibers are described in the Kirk-Othmer Encyclopedia of Chemical Technology, Volume 16, pages 143-159 (2nd ed. 1968).

The third type of fiber employed in the present invention is an acrylic fiber, defined by the Federal Trade Commission as a manufactured fiber "in which the fiber-forming substance is any long-chain synthetic polymer composed of at least 85% by weight of acrylonitrile units

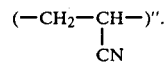

Typical acrylic fibers produced in the U.S. are Orlon (DuPont), Acrilan (Chemstrand), Creslan (American Cyanamid), and Zefran (Dow). Fibers of 100% acrylonitrile are rarely used commercially, and usually acrylonitrile is copolymerized with at least one other monomer. Typical monomers copolymerizable with acrylonitrile are listed below:

| | |
|---|---|
| 1. | Hydrocarbons |
| | styrene |
| | alphamethylstyrene |
| | isobutylene |
| 2. | Alcohols |
| | allyl alcohol |
| | methallyl alcohol |
| | alphahydroxymethylacrylonitrile |
| | allyloxyethanol |
| 3. | Ethers |
| | vinyl methyl ether |
| | allyl ethers of amino alcohols |
| | vinyl ethers of amino alcohols |
| | allyl glycidyl ether |
| 4. | Halides |
| | vinyl chloride |
| | vinylidene chloride |
| 5. | Amines |
| | 2-vinylpyridine |
| | 2-methyl-5-vinylpyridine |
| | allyldimethylamine |
| | 2-vinylquinoline |
| 6. | Amides |
| | acrylamide |
| | N-dimethylacrylamide |
| | N-dimethylaminopropylacrylamide |
| | N-(2-hydroxyethyl)acrylamide |
| 7. | Acids (or their salts) |
| | acrylic acid |
| | methacrylic acid |
| | itaconic acid |
| | vinylbenzenesulfonic acid |
| 8. | Ketones |
| | vinyl methyl ketone |
| | alphaacetoxystyrene |
| 9. | Acrylates |
| | methyl acrylate |
| | methyl methacrylate |
| | N-dimethylaminoethyl acrylate |
| | methyl alphaacetaminoacrylate |
| | methoxyethyl acrylate |
| | methyl alphachloroacrylate |
| 10. | Vinyl esters |
| | vinyl acetate |
| | vinyl chloroacetate |
| 11. | Miscellaneous |
| | allylpyridinium chloride |
| | N-vinyl-N,O-diethylisourea |
| | vinylidene cyanide |

The preparation of these fibers is described in the Kirk-Othmer Encyclopedia of Chemical Technology, Volume 1, pages 313–338 (2nd ed. 1968).

Fiber lengths are not critical. However, it is preferred that the fiber lengths be from about 500μ to about 5000μ. In addition, the fiber diameter, shape and nature of the fiber are of minor importance. In general, the fibers are employed in the structure and size resulting from their manufacturing process. In other words, it is possible to use commercially available fibers, if necessary after cutting to the desired length range.

The amount of synthetic fiber employed is from about 5 phr to about 50 phr, preferably about 5 phr to about 20 phr.

Another component of the present invention is a pigment such as titanium dioxide. The titanium dioxide is very useful in masking the "frosting" in the surface layer. The amount of pigment employed is typically between about 0.1 and about 10 phr, preferably between about 0.1 and about 4.0 phr.

Other polymers, colorants, stabilizers, and additives may also be added to the compositions of the present invention.

The components of this invention may be combined by processes known in the art including blending such as by various continuous mixers, extrusion, Banbury mixing or by dry-blending procedures. In the latter case, it is preferred that the block copolymer be formed or ground in particles having an average size less than about 4 millimeter diameter into which the extending oil is absorbed. Following this, the remaining powdered components may be added and vigorously dry-blended therewith such as in well-known dry-blending equipment long used in the PVC dry-blending art.

In order to produce unit soles having a suede appearance it is necessary that the various components be blended together at temperatures below the melting point of the fibers. The preferred blending temperature range for continuous melt mixing or Banbury mixing is about 120° C. to about 210° C., preferably about 140° C. to about 180° C. Dry blending temperatures are normally below about 95° C.

The use of the present composition in footwear includes especially their use in soling when prepared by injection molding and slab soling, such as produced by cutting shoe sole forms from extruded slab-stock. The advantage of the present compositions are most apparent in injection molding of unit soles which are later attached by adhesion or sewing to uppers. In this situation, it has been found that the unit soles are readily removed from the injection mold and have reduced weld line formation on the surface. These unit soles (which term refers in the trade to a sole including an integral heel portion) are useful both as a leather replacement and as an improvement over the prior art vinyl soles. The compositions also may be used in the manufacture of injection molded canvas shoe soles wherein the soling is directly injection molded onto the canvas upper.

The invention is further illustrated by means of the following illustrative embodiment, which is given for the purpose of illustration alone and is not meant to limit the invention to the particular reactants and amounts disclosed.

ILLUSTRATIVE EMBODIMENT I

In Illustrative Embodiment I, a comparison was made between a composition made according to the invention and a composition made outside of the invention. In both compositions the block copolymer was a branched styrene-butadiene block copolymer, the oil was a standard paraffinic extending oil, and the styrene polymer was high impact polystyrene. The silica compound employed was a HISIL silica and the fiber was a polyester/acrylic fiber blend obtained from Akron Chemical Company. The ethylene-vinyl acetate copolymer was obtained from DuPont.

The individual components were mixed on a Banbury Mixer at about 144° C. for about 2 to 5 minutes. Samples of the various compositions were tested according to the following tests:

| Test | Standard Test Number |
|---|---|
| Taber Abrasion | D-1044 |
| Ross cut growth | D-1052 |

In addition, the various compositions were used in the injection molding of unit soles in a Lorenzin machine at about 193° C.

The various formulations and test results are presented below in Table 1.

TABLE 1

| Composition (Parts by weight) | A | B |
| --- | --- | --- |
| Block copolymer | 100 | 100 |
| Extending Oil | 111 | 118.8 |
| HIPS | 30 | 30 |
| Ethylene/vinyl acetate copolymer | — | 13 |
| Poly(alpha methylstyrene) | 18 | 18 |
| Fiber | — | 13 |
| Silica | — | 7.8 |
| $TiO_2$ | 0.65 | 0.76 |
| Test Results | | |
| Melt Flow | 22.7 | 10.3 |
| Hardness inj. mold (inst./10 sec.) Shore A | 52/47 | 57/53 |
| ROSS FLEX (KC to 500% growth) | 212 | 335 |
| TABER Abrasion (cc/KC) | 0.48 | 1.03 |
| Adhesion, pli | 42 | 40 |
| Specific Gravity | 0.951 | 0.973 |
| Appearance [a] (5 best) | | |
| Uniformity of texture | 5 | 4.5 |
| Degree of roughness (5 finest dimensions) | smooth | 5 |
| Visible Weld lines | 2 | 5 |

What is claimed is:

1. A footwear composition having a simulated suede appearance comprising:

(a) 100 parts by weight of a block copolymer having at least two monoalkenyl arene polymer end blocks A and at least one elastomeric conjugated diene mid block B, each block A having an average molecular weight between about 5,000 and about 125,000 and each block B having an average molecular weight between about 15,000 and about 350,000, said blocks A comprising 8–65% by weight of the copolymer;

(b) about 5 to about 125 parts by weight of a styrene polymer;

(c) about 5 to about 175 parts by weight of a hydrocarbon extending oil;

(d) about 2 to about 150 parts by weight of a finely divided silica filler;

(e) about 0.1 to about 10 parts by weight of a pigment; and (f) about 5 to about 50 parts by weight of a synthetic fiber selected from the group consisting of polyamide fibers, polyester fibers, acrylic fibers, and mixtures thereof;

wherein the various components are melt blended at a temperature below the melting point of said synthetic fiber.

2. A composition according to claim 1 wherein said block A is a polystyrene block and said block B is a polybutadiene block.

3. A composition according to claim 2 wherein said styrene polymer is high impact polystyrene.

4. A composition according to claim 1 wherein said block copolymer is selectively hydrogenated such that no more than about 25% of the aromatic double bonds of block A are reduced by hydrogenation while at least 75% of the aliphatic double bonds of block B are reduced by hydrogenation.

5. A composition according to claim 1 wherein said synthetic fiber is a blend of a polyester fiber and an acrylic fiber.

6. A composition according to claim 1 wherein the components are blended together at a temperature between about 120° C. and about 210° C.

7. A composition according to claim 1 wherein said pigment is titanium dioxide.

8. A shoe sole having the composition of claim 1.

* * * * *